(12) United States Patent
Smith

(10) Patent No.: US 6,701,313 B1
(45) Date of Patent: Mar. 2, 2004

(54) METHOD, APPARATUS AND COMPUTER READABLE STORAGE MEDIUM FOR DATA OBJECT MATCHING USING A CLASSIFICATION INDEX

(76) Inventor: Glenn Courtney Smith, 33 Tiverton Dr., New Eltham, London SE9 2BX (GB)

( * ) Notice: Subject to any disclaimer, the term of this patent is extended or adjusted under 35 U.S.C. 154(b) by 470 days.

(21) Appl. No.: 09/583,718

(22) Filed: May 30, 2000

(30) Foreign Application Priority Data

Apr. 19, 2000 (GB) .............................. 0009750

(51) Int. Cl.[7] .............................................. G06F 17/30
(52) U.S. Cl. ......................................... 707/6; 707/100
(58) Field of Search ........................... 707/3, 6, 10, 100

(56) References Cited

U.S. PATENT DOCUMENTS

| | | | | |
|---|---|---|---|---|
| 5,666,442 A | * | 9/1997 | Wheeler ..................... | 382/209 |
| 5,737,594 A | * | 4/1998 | Williams ...................... | 707/6 |
| 5,768,580 A | * | 6/1998 | Wical .......................... | 707/102 |
| 5,806,061 A | * | 9/1998 | Chaudhuri et al. ............ | 707/3 |
| 5,946,681 A | * | 8/1999 | Shorter .......................... | 707/3 |
| 6,108,645 A | * | 8/2000 | Eichstaedt et al. ............. | 707/1 |
| 6,311,178 B1 | * | 10/2001 | Bi et al. ........................ | 707/3 |

* cited by examiner

*Primary Examiner*—Greta Robinson
(74) *Attorney, Agent, or Firm*—Dykema Gossett PLLC

(57) ABSTRACT

A method of data object generation and matching and an apparatus to perform data object generation and matching uses a predetermined classification index relating to a specific subject to allow two or more users of different types to specify their requirements relating to the subject, and a data object containing the specified requirements in accordance with the classification index is created and stored. When it is desired to match two users of different types the stored data objects are compared, and matching can be undertaken on the basis of corresponding or matching requirements in the respective data objects. The method is particularly suitable for use over the Internet, allowing users to generate and store data objects remotely, for matching in a back-end web server system. Any matching data objects found to match to a particular user's generated data object can be communicated to the particular user over the Internet. The method and apparatus are particularly suitable for use in matching one type of user in the form of a potential employer to another type of user in the form of a potential employee.

47 Claims, 10 Drawing Sheets

| POINTER NO. (#) | FIELD.NAME | CATEGORY (EXAMPLE) | ATTRIBUTE.LABEL (EXAMPLE) |
|---|---|---|---|
| 1 | Category_1.attribute_1 | "grade" | "junior" |
| 2 | Category_1.attribute_2 | "grade" | "intermediate" |
| 3 | Category_1.attribute_3 | "grade" | "senior" |
| 4 | Category_2.attribute_1 | "job type" | "permanent" |
| 5 | Category_2.attribute_2 | "job type" | "contract" |
| 6 | Category_2.attribute_3 | "job type" | "contract-to-permanent" |
| ... | ... | ... | ... |
| ... | ... | ... | ... |
| n | Category_n.attribute_n | Category name | attribute |

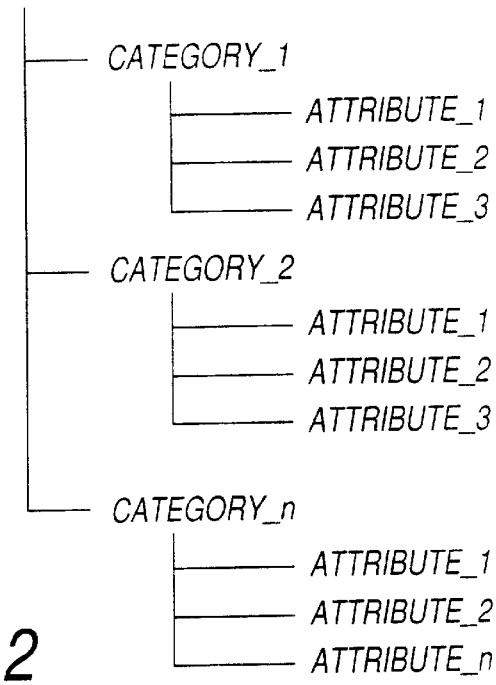

Fig.2

| POINTER NO. (#) | FIELD.NAME | CATEGORY (EXAMPLE) | ATTRIBUTE.LABEL (EXAMPLE) |
|---|---|---|---|
| 1 | Category_1.attribute_1 | "grade" | "junior" |
| 2 | Category_1.attribute_2 | "grade" | "intermediate" |
| 3 | Category_1.attribute_3 | "grade" | "senior" |
| 4 | Category_2.attribute_1 | "job type" | "permanent" |
| 5 | Category_2.attribute_2 | "job type" | "contract" |
| 6 | Category_2.attribute_3 | "job type" | "contract-to-permanent" |
| ... | ... | ... | ... |
| ... | ... | ... | ... |
| n | Category_n.attribute_n | Category name | attribute |

Fig.3

*First Sub-Class (must be 100% matched)*
1 Minimum education level
2 References
3 Region
4 Job category
5 Type of professional membership
6 Generic title
7 Job grade
8 Job type
9 Environment
10 Dress code
11 Company type
12 Daily hours
13 Salary range (permanent)
14 Salary range (contract) Hourly/Daily

*Second Sub-Class* (must be 80% matched)
1 Skills desired-unqualified (selective matchable)
2 Skills required-qualified (selective matchable)(unspecified)
3 Skills experience 0-6 months to 3+ years

*Third Sub-Class* (variable % matching - threshold set by Job Provider)
1 Holidays
2 Shifts
3 Disabled access
4 Bonus
5 Credit card expenses
6 Car park
7 Pension
8 Subsidies
9 Mobile phone
10 Shares options
11 Health cover
12 Company car
13 Commission
14 Paid overtime

*Fourth Sub Class* (optional matching-threshold set by Job Provider)
1 Qualifications (actual) specified
2 Start date
3 Medical required
4 Professional membership

*Fig.13*

METHOD, APPARATUS AND COMPUTER READABLE STORAGE MEDIUM FOR DATA OBJECT MATCHING USING A CLASSIFICATION INDEX

TECHNICAL FIELD

The present invention relates to a method and apparatus for data object generation and matching, a computer readable storage medium for storing a program for performing the method of data object generation and matching, and a business method which makes use of the method and apparatus.

More particularly, the present invention relates to a method and apparatus for data object generation and matching wherein users of different types employ a common classification system to categorize an activity or entity to create a data object corresponding to the respective activity or entity, it then is possible to automatically match compatible activities or entities on the basis of the created data objects corresponding thereto.

BACKGROUND TO THE INVENTION

In a modern free market economy goods and services are traded on a daily basis in accordance with the rules of supply and demand. However, the successful operation of such an economy ultimately relies upon either the vendor of the goods or services, whatever these may be, being able to locate a vendee whose requirements substantially match those provided by the goods and services on offer from the vendor, or vice versa. As will be apparent, this is an age old business problem inherent to any economy based upon free trade.

A particularly complicated free-market sector is that of the provision of labour services, and the efficient matching of the labour services of any particular individual to any particular job or employment position. Indeed, the specific problems posed by the most appropriate matching of the right personnel to the right job are so extensive that in recent years there has been extensive growth in the Human Resources (HR) industry, both within traditional employers expanding their HR departments, and within the third-party agency sector. The numerous disadvantages and cost for both employers and employees of using third-party agency services, however, mean that it is preferable for most positions to be filled by direct contact between the employer and the potential employee. This route, however, suffers from the general problem referred to above of how to bring together the right person and the right job.

The traditional method of finding the most appropriate person for a job usually involves the employer advertising the job in a publication such as a newspaper or trade journal. Potential employees then contact the employer to arrange an interview, at which the potential employee's suitability for the job is assessed by the employer and a decision is made as to whether or not to offer the potential employee the advertised job. In such circumstances, the employer acts as a job provider, and the potential employee as a job seeker, and these terms will be used hereafter to refer to such parties. In this traditional method, the publication such as the newspaper or trade journal acts as the medium by which the job provider and job seeker are initially brought together and contact is first made.

Advances in communications technology in recent years have led to the rise of new media by which job providers and job seekers may make a first initial contact. In particular, the growth of the Internet, and in particular the World Wide Web has led to a new communication media providing access to millions of people worldwide, and it is therefore unsurprising that this new medium has already been adapted to address the issue of recruitment. Various Internet based recruitment systems already exist.

The first generation of on-line systems specifically aimed at the recruitment problem merely mirrored the format of traditional newspaper or trade journal jobs pages, providing lists of job adverts from job providers in the form of electronic bulletin boards or web pages.

In order to find a suitable job on such a first generation system, a job seeker would have to potentially review many hundreds of adverts, and interpret each advert regarding the specific job advertised. Such systems place a large burden on the job seeker when in use to both search through and analyse each advert to find any that may match their requirements.

Following the first generation system, second generation on-line recruitment services are also known which provide rudimentary search facilities akin to those provided by Internet search engines. These facilities allow a job seeker to search through job adverts posted on a particular site on the basis of keywords entered by the job seeker to determine the existence of those keywords in any of the posted adverts. Such searching techniques are standard Internet search tools, and will be well known to both the man skilled in the art and the lay reader familiar with Internet use.

Second generation systems improve upon the first generation systems by allowing the job seeker to narrow down the number of adverts for review. However, there is still a need for an on-line system which allows for a more refined search to be performed in order to further reduce the burden on the job seeker and/or job provider.

Although the above background has been presented in relation to the problems of the recruitment and labour market, it will be appreciated that similar problems exist in general throughout every sector of a free market economy, in that a vendor of goods and services must be able to locate a suitable vendee (or vice versa) with coincidental needs which substantially match the attributes of the goods or services provided by the vendor. It will be further appreciated that similar problems to those described above exist for both the vendor and vendee.

SUMMARY OF THE INVENTION

The present invention addresses the problem of matching coincidental needs relating to an activity or entity by the provision of a classification system specific to the particular activity or entity to be traded or exchanged which allows parties to the trade to define their requirements in a standardised format. Once the parties requirements have been placed in the standardised format, it then becomes possible to automatically match the coincidental requirements by machine, thereby bringing together the parties to the trade or exchange in a time efficient and cost effective manner.

From a first aspect, the present invention provides a method of data object generation and matching using a database having data fields for storing a plurality of predefined classification categories, each of said categories containing one or more predefined user-selectable attributes, said method comprising the steps of pre-storing one or more data objects of a first type in the database, each of said data objects storing one or more pre-selected attributes of one or more of said plurality of classification categories;

displaying said plurality of classification categories to a user for selection of one or more attributes from at least one of said classification categories;

storing the selected attributes in a database in the form of a data object of a second type;

comparing the stored attributes of the data object of the second type with the stored pre-selected attributes of a data object of the first type; and matching said data objects of the respective types which have at least a predetermined number of common stored attributes.

Preferably, the pre-stored data objects of the first type are created by displaying the plurality of classification categories to a user of a first type for selection of one or more attributes from at least one of the classification categories, and then storing the selected attributes in the database in the form of a data object of a first type. In such a case, the attributes selected and stored as a data object of the second type are selected by a user of the second type.

The classification categories may be divided into two or more sub-classes, and the correlation between the attributes of the sub-class compared when matching data objects. Each sub-class may be assigned a different acceptability threshold, with the data objects being matched only when the number of common attributes in each sub-class exceeds the threshold set for that class. As a result, classification categories can be group generally according to their importance, with a first sub-class requiring the highest level commonality, say 100%, with second and further sub-classes allowing for a lower level of correlation.

In a preferred embodiment, the classification categories and attributes are displayed to the users of either the first or second type by transmitting the plurality of classification categories in the form of web pages over the Internet for display using a web browser, which users of the first or second types then use to select the required attributes in each required classification category, the web browser then sending the user's attribute selection over the Internet in the form of data generated by the web browser to be stored as data objects of the first or second type as appropriate in the database.

In another preferred embodiment, the user-selected attributes are stored in the database in the form of pointers to a look up table containing the attribute name and/or description, and the comparison of the stored attributes of the stored data objects is performed on the basis of numerical comparison of the pointers. This has the advantage that database memory is maximized and the comparison is performed in a computationally efficient manner.

From another aspect, the present invention also provides an apparatus arranged to perform data object generation and matching, comprising:

database means for storing a database having data fields corresponding to a plurality of predefined classification categories, each of said categories containing one or more predefined user selectable attributes, said database pre-storing one or more data objects of a first type, each of said data objects storing one or more pre-selected attributes of one or more of said plurality of classification categories;

means for displaying said plurality of classification categories to a user for selection of one or more attributes from at least one of said classification categories;

database management means, said database management means further comprising:

database writing means for writing the user selected attributes in a database in the form of a data object of a second type;

attribute comparison means for comparing the stored attributes of the data object of the second type with the stored pre-selected attributes of the data objects of the first type; and data object matching means for matching data objects of respective types which have at least a predetermined number of common stored attributes.

Preferably, the data objects of the first type are generated and stored by users of a first type, and the data objects of the second type are generated and stored by users of a second type.

The classification categories may be divided into two or more sub-classes, and the data object matching means may match each sub-class individually. Each sub-class may be assigned a different acceptability threshold, with the data object matching means matching data objects when the number of common attributes in each sub-class exceeds the threshold set for that class, and preventing a match if the correlation between any one of the sub-class is below that sub-class threshold. As a result, classification categories can be group generally according to their importance, with a first sub-class requiring 100% commonality, with second and further sub-classes allowing for a lower level of correlation.

In a particularly preferred embodiment, said means for displaying the plurality of classification categories to a user preferably comprise means for transmitting said plurality of classification categories to users of the first or second types in the form of web pages over the Internet for display using a web browser, and means for receiving the user's attribute selections over the Internet in the form of data generated by the web browser. In such an embodiment, the users of the first or second types use the web browser to select the required attributes in each classification category.

Preferably, the database means stores the data objects in the database in the form of pointers into a look up table containing the attribute name and/or description, the attribute comparison means then comparing the attributes of each stored data object on the basis of the pointers stored in the data base as a numerical comparison.

From a yet further aspect, the present invention also provides a computer-readable storage medium for storing a data object generation and matching program for use with a database having data fields corresponding to a plurality of predefined classification categories, each of said categories containing one or more predefined user-selectable attributes, the program being further arranged to control the steps of:

pre-storing one or more data objects of a first type in the database, each of said data objects storing one or more pre-selected attributes of one or more of said plurality of classification categories;

displaying said plurality of classification categories to a user for selection of one or more attributes from at least one of said classification categories;

storing the selected attributes in the database in the form of a data object of a second type;

comparing the stored attributes of the data object of the second type with the stored pre-selected attributes of the data objects of the first type; and matching data objects of respective types which have at least a predetermined number of common stored attributes.

It is a feature of the present invention that the generated data objects represent an abstraction of the activity or entity to which they relate in accordance with the selected attributes of the various predefined classification categories. The predefined classification categories and predefined user selectable attributes are therefore preferably application specific, that is the chosen categories and attributes contained therein are specific to the particular activity or entity which is to be classified using the classification categories. Using the same classification categories to abstract the respective requirements of users allows objective matching of the users requirements by machine.

In a particularly preferred embodiment relating to the recruitment market, the classification system comprises a plurality of pre-defined classification categories relating to job activities and features, the attributes then being descriptive of qualitative values which may attach to the categories. For example, classification categories relating to the recruitment market may be such categories as, for example, "job category", "grade", "dress code", etc, etc, whereas attributes relating to, for example, the "grade" category may be, for example, "junior", "intermediate", "senior" etc et al.

Furthermore, in the particularly preferred embodiment referred to above, the user of the first type is preferably a job-provider and the data object of the first type is preferably a profile of a job on offer in terms of appropriate selected attributes from the classification categories which qualitatively and/or quantitatively relate to the activities involved in the job. Moreover, in the embodiment the user of the second type is preferably a job seeker, and the data object of the second type is preferably a profile of the job seeker in terms of appropriate selected attributes from the classification which qualitatively and/or quantitatively relate to the skills, background, and/or further requirements of the job seeker.

The present invention has the primary advantage that it enables simple machine matching using a database of coincidental requirements of two users each of a different type.

The present invention has a further advantage, that by the use of the same classification system by users of both types to abstract their respective requirements then the users of one type are provided with a clear and consistent description of the goods or services on offer from the user of the opposite type.

According to a further aspect of the present invention, there is provided a method of objectively comparing the requirements of a first user and a second user, the method comprising the steps of:
(a) providing a classification system having a plurality of classification categories, each category having one or more pre-defined attributes;
(b) displaying each of the categories to a plurality of users;
(c) obtaining information regarding each user's preferred attributes;
(d) storing that information;
(e) comparing the stored information and matching two users if the correlation between the selected attributes exceeds a predetermined threshold.

In a preferred embodiment, the users are of a first or primary type, such a job providers, or a second or subsidiary type, such as job seekers. The classification system may be presented in the form of an Internet page or the like and contain a template which can be readily adapted by the job provider to suit their specific requirements. The method may also include the step of testing the user of, say, the second type, and only matching users of respective types if the attribute correlation is above the predetermined threshold and the user of the second type performs satisfactorily in the testing procedure. As with the classification template, the or each test may be provided in a form that is readily adaptable by the user of the first type to suit their specific requirements.

BRIEF DESCRIPTION OF THE DRAWINGS

Further features and advantages of the present invention will become apparent from the following description of a number of embodiments thereof, presented by way of example only, and with reference to the accompanying drawings, in which:

FIG. 2 illustrates the hierarchical structure of the classification categories and attributes used in the present invention;

FIG. 3 illustrates an example look-up table relating to the classification categories and attributes used in the present invention;

FIG. 13 is a table showing classification categories for method or apparatus according to the invention adapted for use in the field of human resource management and broken down into a number of sub-classes.

DESCRIPTION OF THE PREFERRED EMBODIMENTS

A first embodiment of the present invention will now be described with reference to FIGS. 1 through to 8.

Figure 1:
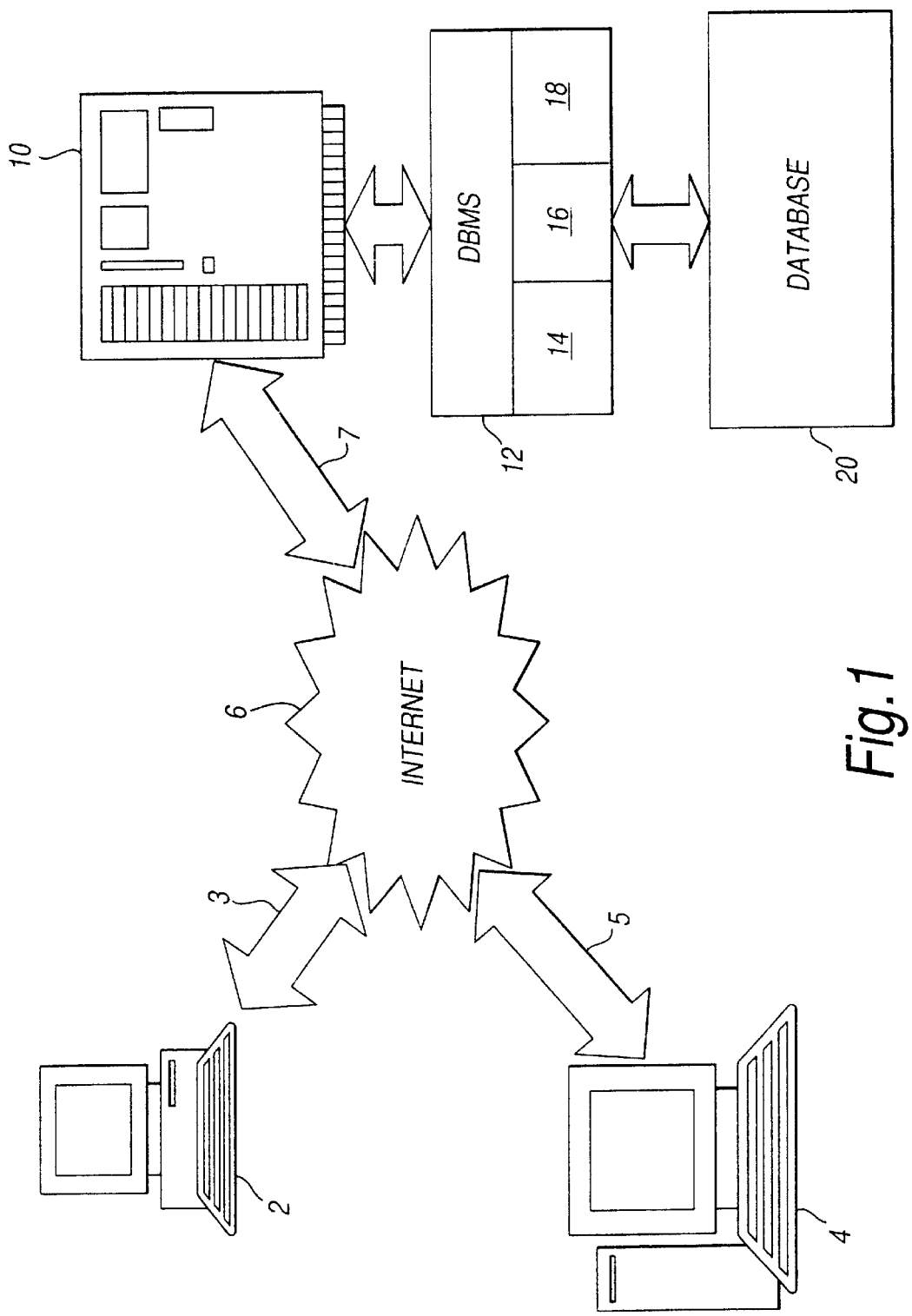
FIG. 1 is a block schematic of a first embodiment of the present invention.

With reference to FIG. 1, a user of a first type provided with a computer 4 equipped with appropriate client software such as a web browser communicates via network means 5 over the Internet 6 with a web server 10 provided with network means 7 for linking with the Internet. Similarly, a user of a second type is further provided with a computer 2 equipped with appropriate client software such as a web browser and network means 3 for accessing the Internet 6 also communicates with the web server 10 via the Internet 6 and the network means 7 provided at the web server. The web server 10 is further provided with a computer readable storage medium such as, for example, a hard disk or memory for storing a program controlling the actions of the web server. In addition, the web server is further provided with a structured storing means constituting a database 20, which is controlled by virtue of a database management system 12 which comprises at least a database writing means 16 for controlling data entry to and from the database, an attribute comparison means 14 for comparing the stored attributes of data objects stored in the database for determining the similarity therebetween, and a data object matching means 18 arranged to match those data objects which the attribute comparison means 14 has determined have at least a pre-determined number of common stored attributes.

In addition to those elements shown, the web server 10 further comprises a means for storing a classification index specific to a particular activity or entity, and means for displaying the classification index to users of either the first or second type over the Internet 6 by virtue of the provision of web pages displaying the classification index and allowing the users to select appropriate attributes from each classification category in the index as required using a web browser. The structure of the classification index is shown in FIG. 2.

With reference to FIG. 2, the classification index used in the present invention is a hierarchical classification index comprising a plurality of categories (category_1, category_2, . . . category_n), each category having one or more attributes (attribute_1, attribute_2, . . . attribute_n) which may be selected by a user. Within the present invention, each classification index is devised such that it is particular to the activity or entity to be matched using the present invention, and each classification index must be devised in advance by analysis of the various categories and sub-attributes which may be used to describe the activity or entity. For example, when the present invention is applied to matching job seekers with job providers, suitable examples of categories may be "job category", "generic title", "grade", "job type", etc., etc., each category then having sub-attributes associated therewith descriptive of quantitative or qualitative values which may attach to the category. For example, with respect to the "job category" category, attributes which may attach to this category may be, for example, "information technology", "telecommunications", "legal", "sales", "other", etc., etc., and attributes which may attach to, for example, the "grade" category may be such as, for example, "junior", "intermediate" and "senior". As will be appreciated, it is possible to have many different categories each with many attributes depending upon the activity or entity which any particular classification index is attempting to classify.

With reference to FIG. 13, the categories are divided into a number of sub-classes. Each category is assigned a different acceptability threshold, and categories with the same threshold are grouped together. Categories that are regarded as essential to the selection of a job seeker are classed in a primary class having a 100% matching threshold; a match of data objects will only be possible if the selected attributes of all the categories in the primary class are the same. Other sub-classes may have a lower matching threshold depending on the importance of the categories in question.

Whilst the classification index described above has been described in relation to general activities performed by an employee in employment, it will be understood that it is also possible for classification indexes to be devised in relation to almost any activity or entity such as, for example, tradable goods such as cars, computers, houses, etc., or activities such as hobbies, introductions, personal services, etc.

As mentioned previously in the preamble, the purpose of the present invention is to provide a method and apparatus which allow users of the first and second type to quantify their respective requirements with respect to coincident activities or entities using the same classification index relating to the particular activity or entity in question, and to store a respective data object corresponding to the selected attributes from the classification index relating to the specific activity or entity in a database. Once stored in the database, as the data objects were created using the same classification index by each user of the respective type, it is possible to machine-match the respective attributes of each data object in order to match appropriately the data objects, and hence the respective users, of each type. In order to allow matching of data objects, it is necessary first to populate the database with data objects, and the steps required for this will be described in relation to FIGS. 6 and 7.

Figure 6:
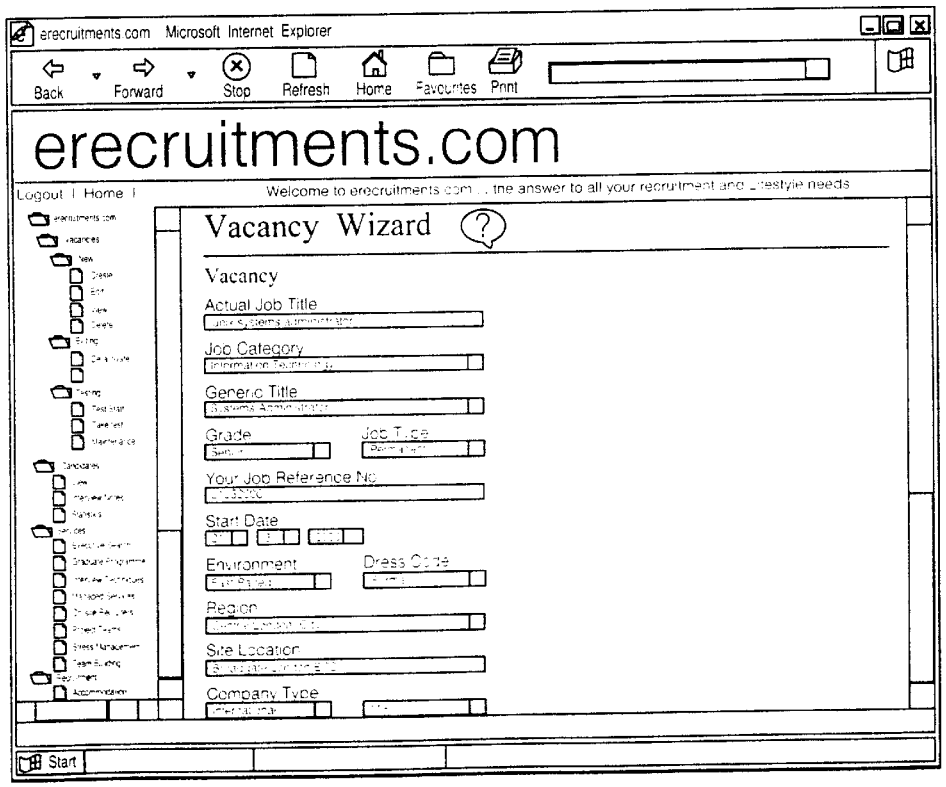
FIG. 6 illustrates a screen shot of the step of displaying the classification categories and attributes to a user in the present invention.
Figure 7:
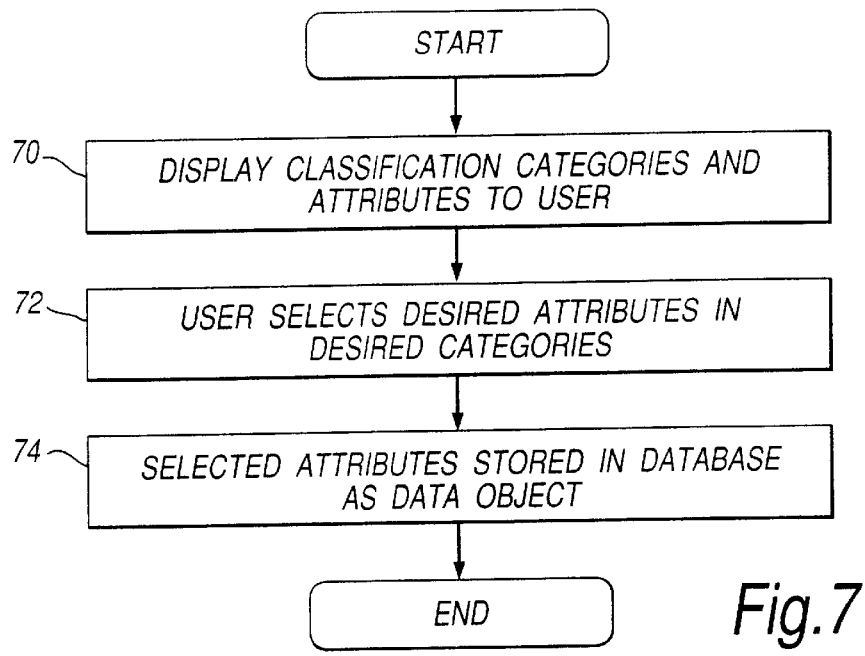
FIG. 7 is a flow diagram showing the steps to be performed to generate a data object in the present invention.

With reference to FIG. 7, in order to create a data object relating to a specific activity or entity using the classification index, a user of either type first accesses the web server 10 via the Internet 6 and performs required registration procedures in order to register with the web site provided by the web server 10. Following the registration procedures, in order to create a data object using the classification index, the web server 10 displays the classification categories and attributes to the user in the form of web pages transmitted to the user over the Internet and to be displayed on the user's computer using web browser software. An example web page displaying relevant classification index categories specific to the field of human resources management is shown in FIG. 6.

With reference to FIG. 6, within the particularly preferred embodiment the categories in the classification index relating to jobs are displayed on the web page as text labels and list boxes are provided beneath each text label to list the attributes in the classification index associated with each category. The user selects the desired attributes from each desired category by accessing the list box and making the appropriate selections of the attributes. It will be appreciated that the user selects the appropriate attributes in each appropriate category on a basis of an objective analysis performed by the user of the requirements of, for example, the job being provided in the case of a job provider, or, in the case of a job seeker, on the basis of the job seeker's qualifications and experience, and the type of job that they are seeking. Therefore, though there is an element of subjective element in the users selections, the provision of the common classification index provides an effective standard for users of both types to effectively describe their requirements.

It will be understood that although the users of the respective types use the same common classification index to define their respective requirements, the classification index need not be presented to the two types of users in the same way, and different graphical user interfaces (GUIs) may be employed for each type of user. By way of example in relation to the recruitment example mentioned previously, the classification index may be presented to a job provider in the form of the text labels and drop down lists as described above, but may be presented to a job-seeker as a Curriculum Vitae (CV) creation module, the relevant information relating to the classification index then being automatically extracted from the created CV. Such automatic extraction is particularly suitable where automated routines are used to help the job-seeker to create and format the CV.

Once the user has made the appropriate selections on the web page, the web browser software on the user's computer transmits data corresponding to the selections over the Internet 6 to the web server 10 wherein the selected attributes are stored in the database as a data object of the appropriate type, depending on the type of the user. In general, if a user of the first type has selected the selected attributes, then the selected attributes will be stored as a data object of type__1, whereas if a user of a second type has selected the selected attributes, then the selected attributes will be stored in the database as a data object of type__2. The two types of data object will be discussed further below.

Figure 4:
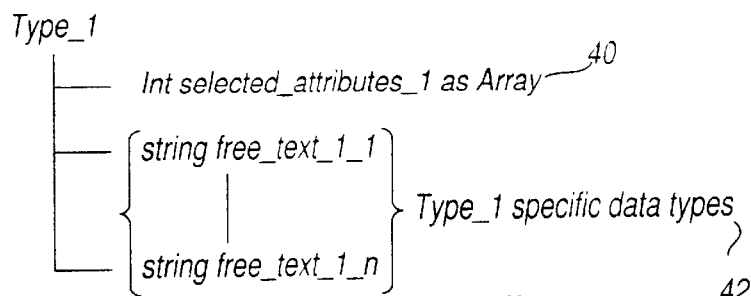
FIG. 4 shows an example data structure of a data object of a first type used in the present invention.
Figure 5:
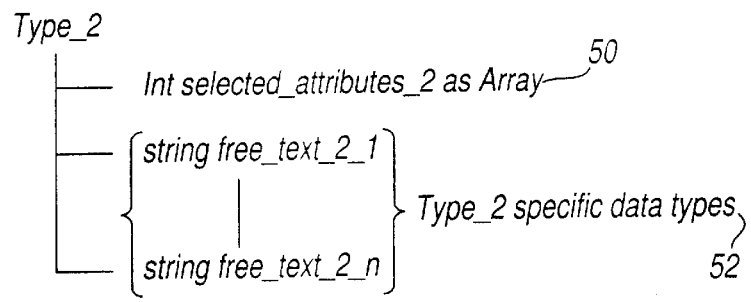
FIG. 5 shows an example data structure of a data object of a second type used in the present invention.

FIGS. 4 and 5 show example data structures that may be used as the data objects of the first and second type of the present invention. More particularly, with reference to FIG. 4, a data object of type__1 for storing the selected attributes of the classification index selected by a user of the first type may comprise an array 40 of integers, the integers corresponding to the selected attributes. In addition, a data object of type__1 may also comprise type-specific data types 42 shown in the drawing as strings of free text, although other data types may be included in the data object and in particular integer values, boolean value, arrays and other data types apparent to the man skilled in the art. Similarly to the above, FIG. 5 shows a data object of type__2, used to save the selected attributes relating to the classification index attributes selected by user of the second type, a data object of type__2 comprising an array of integer values corresponding to the selected attributes, together with type-specific data types which are shown as strings, that may also be, for instance, Booleans, integers, and other data types that will be apparent to the man skilled in the art.

Where the data types type__1 and type__2 store the selected attributes as an array of integers, a separate integer is used to represent a particular attribute of a particular category in the classification index, and a look-up table of integers is provided which index each integer against each attribute in the classification index. An example look-up table of this form is shown in FIG. 3 whence it can be seen that, for example, cateyory1.attribute1 has been allocated integer pointer No 1, category2.attribute2 has been allocated integer pointer No 5, etc. In addition to indexing the integer pointers used to store the selected attributes in the integer arrays in the data objects, the look-up table may also store the category labels and attribute labels as shown. For example, with reference to FIG. 3, category 1.attribute 3, for example, relates to the "senior" attribute of the "grade" category. Thus, by storing the selected attributes in the form of an array pf integers provided in each data object of the respective first and second types, and using the integers as pointers into a look-up table storing category and attribute labels, database storage can be maximised and computational efficiency increased, especially in sorting and matching the selected attributes, as will be discussed later.

As an example of the operation of the look up table, with reference to FIGS. 2 and 3, say, for example, a user of the first type has selected attribute 2 of category 1 and attribute 1 of category 2 as being relevant to the activity or entity to which the classification index relates, a data object of type__1 would be created containing an array of integers obtained from the look-up table corresponding to the particular attributes selected. Thus, in the example given above, the integer pointers 2 and 4 will be stored in the array selected__attributes__1 in the data object of type__1.

With respect to the data object type-specific data types illustrated as strings in the figures, these may instead be data variables such as strings, Booleans, integers etc used to store data object type-specific information. For example, where a data object of type__1 is used to store selected attributes relating to a job description, the data object type__1-specific data types may be data strings used to store, for example, a free text job description, a description of the organisation providing the job, direction details to the location of the job, or any other relevant information. Similarly, the data object of type__2 may store the selected attributes of a job seeker's profile selected from the classification index and stored in the integer array 50. In addition, a data object of type 2 may also comprise further type-specific data variables such as integers and Booleans, with strings being used to store information such as, for instance, the job seekers' interests, hobbies, aspirations, etc etc. Furthermore, it is also envisaged that the data objects of the first and second types should not be limited to being constructed of data variable types commonly found in computer programming languages, but may also contain multi-media data types or files such as, for example picture files such as TIFFs, and JPEGs, moving picture files such as MPEGs and AVIs, as well as audio files such as WAV files.

Moreover, it should be understood from the above that the data objects are effectively split into two types of data variables, being the selected attributes from the classification index stored as an array of integers, each integer being a pointer into a look up table and which are used for matching data objects of each respective type together, and data object type-specific data variables which merely provide further information concerning the activity or entity and which are not used for matching.

Having described the various elements and data objects of the present invention, the matching operation of the present invention will now be described with reference to FIG. 8.

First of all, assume a user 4 of the first type has populated the database 20 via the web server 20 and Internet 6 with a number of data objects of the first type corresponding to, for example, job descriptions of jobs being offered by the user of the first type, in which case the user of the first type is a job provider. The user of the second type, being in the described example a job seeker, accesses the web server 10 via the Internet 6 and registers as a user with the web server 10. The user 2 of the second type is then presented with the classification index in the form of a web page for selection of those attributes in each category which best describe their skills, qualifications, experience, etc. The user of the second type selects the desired attributes in the desired categories and the selection is communicated via the Internet back to the web server 10 for storage in the database 20 as a data object of the second type. The database management system 12 of the web server 10 then matches the data object of the second type with the pre-stored data objects of the first type in the following manner.

Figure 8:
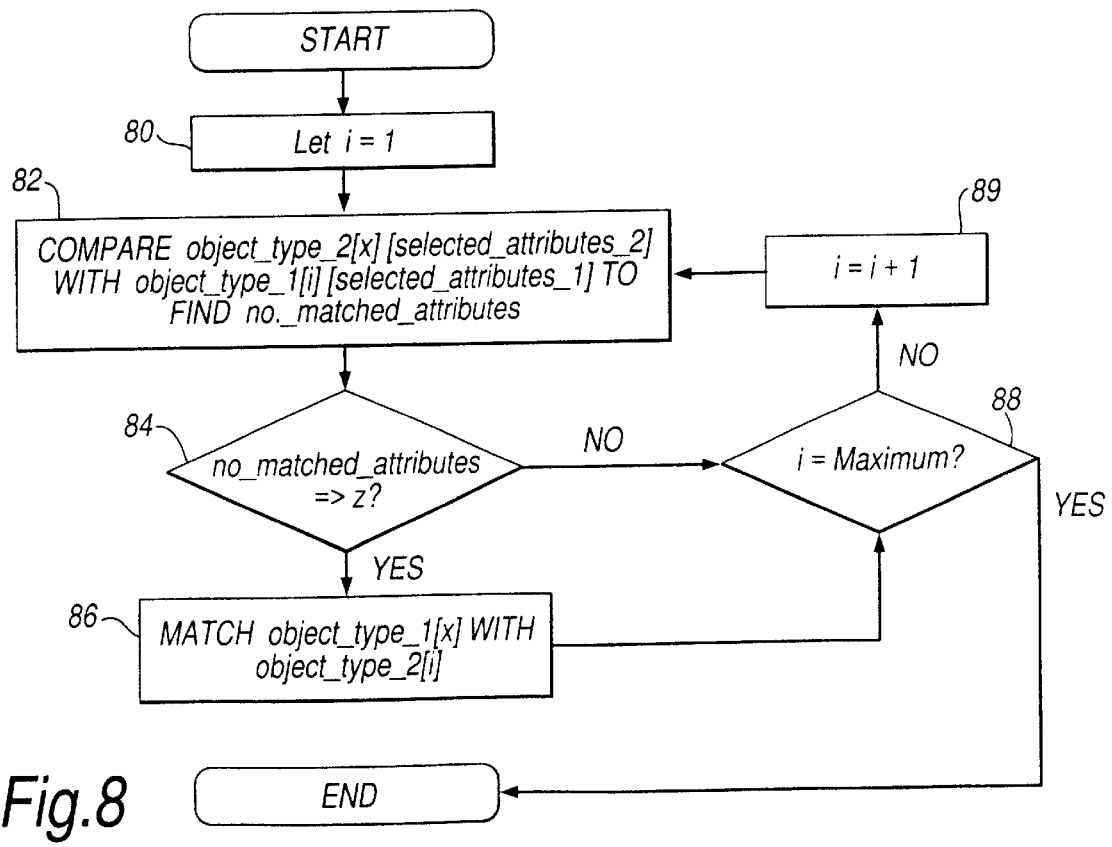
FIG. 8 is a flow diagram illustrating the matching process to match data objects of different types in the present invention.

With reference to FIG. 8, at step 80 a counter i is initialised to 1, and at step 82 the integer array selected__attributes__2 of object__type__2[x], being the data object generated by the job seeker and containing the job seekers selected attributes from the classification index, is compared with the selected__attributes__1 integer array of object__type__1[i], being the i-th data object of the first type pre-stored in the database, to find the number of matched attributes between the data object of the second type created by the user of the second type and the i-th data object of the first type stored in the database and pre-created by a user of the first type, being the job provider. The matching may be performed as a simple comparison of each element of the integer array of the data object of the second type with each element of the integer array of the i-th data object of the first type, and a count number__matched__attributes is kept of those array elements found to match. The comparison is performed in the attribute comparison means 14 of the database management system 12.

Following the comparison, the value number__matched__attribute is compared at step 84 with a predetermined number z to determine whether the count of matched attributes is greater than or equal to the predetermined number z, and if so then the data object of the second type [x] is matched with the data object of the first type [i] at a step 86. An evaluation is then undertaken at step 88 to check that i is not a maximum ie that all of the data objects of the first type have not been compared with the data object of the second type and if not, then the counter i is incremented at step 89 and the comparison of the data object of the second type [x] is compared with the data object of the first type [i] once again. If it is determined that the value number_matched_attributes is less than the predetermined value z, then the evaluation of step 88 is undertaken to check that i is not a maximum, and processing continues as described above. If the counter i has reached a maximum, in that the data object of the second type [x] has been compared with every data object of the first type stored in the database, the matching procedure ends.

With respect to the predetermined value z against which the count number_match_attributes is compared, this may be any value and may be specified by the user. As will be apparent from the description of the operation of the matching process as described above, the higher the value of z the greater the number of common selected attributes between the data objects of the two types there must be in order for there to be a match, and by varying the predetermined number z it becomes possible to alter the number of matching objects found which correspond to a particular data object. The value z may be predetermined in advance, or may be set by a user of either the first type or the second type. In a preferred embodiment, the value z is set to ten.

Once the matching process has been completed, in a preferred embodiment of the present invention those data objects of the first type which had been found to match with the data object of the second type generated by the user 2 are displayed to the user 2 by the web server 10 over the Internet 6 in the form of web pages. The user 2 may then browse through the matched data objects to determine any of interest, and may then contact those users of the first type which had generated the data objects of the first type of interest and stored them in the database.

Although the matching process has been described with a single predetermined threshold for matching, it will be understood that it can be readily adapted to provided a number of different thresholds when the classification categories are divided into a number of sub-classes.

While the above description has concentrated on a job seeker using the method and apparatus of the present invention to search the database which has been pre-stored with profiles of jobs in the form of data objects using the classification index by a job provider, it will be appreciated that the reverse operation is also possible, ie it may be possible for multiple job seekers to generate their profiles in the form of data objects of the second type and store the generated data objects in the database 20, and for a job provider to search through the profiles of job seekers by creating a job profile using the classification index to generate a data object of the first type.

Furthermore, it will be further appreciated that the present invention is particularly suitable for multiple users of either type, in which case registration and user identification procedures are provided by the web server as required in order for identification of each user, and with respect to which data object or objects each user has stored within the database. In this case, each data object of the first or second type may further comprise a data variable field to indicate the particular user who created the object.

In addition to the above described method and apparatus for generating data objects and writing the generated objects into the database, the present invention also provides means for allowing a user of either type to remove a data object from the database which he, she or they have created previously. This facility is required in order to maintain the database up to date, and to prevent matching between data objects corresponding to activities or entities that have already been traded, exchanged or fulfilled.

While the above description has been presented in relation to the problem of human resources management and recruitment, it will be understood that the present invention has application in any field of commerce, and in particular it may be used to match any goods or services provided a classification index may be devised which may be used by users of each type to quantify and qualify their respective requirements in to a machine-matchable format.

A second preferred embodiment of the present invention will now be described with respect to FIGS. 9, 10 and 11, which has particular application to the problem of human resources management and recruitment.

Figure 9:
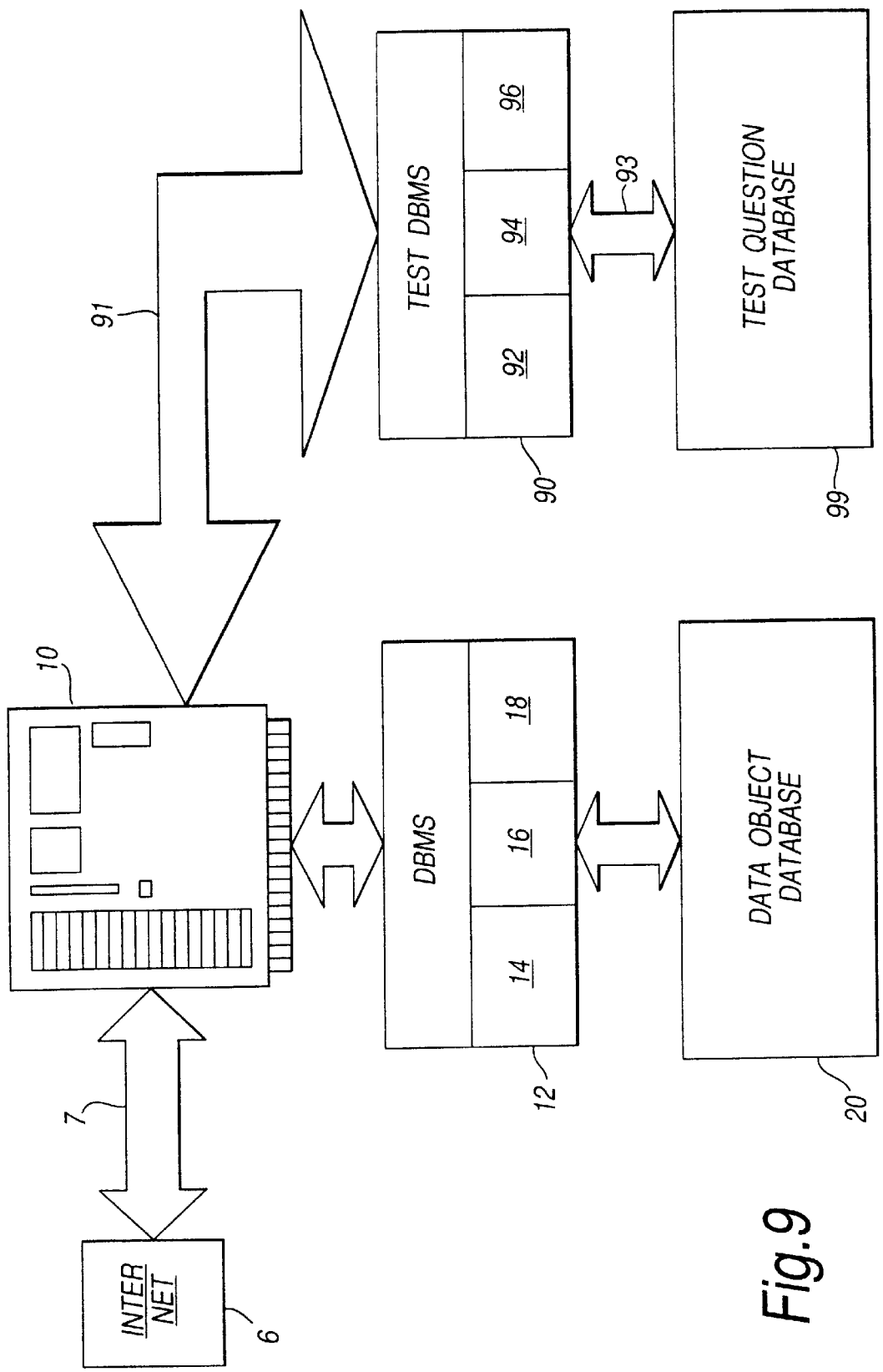
FIG. 9 shows a block schematic of a system according to a second embodiment of the present invention provided with a test question database.

With reference to FIG. 9, FIG. 9 illustrates a box diagram of a second preferred embodiment of the present invention, wherein common elements between the second preferred embodiment and the first preferred embodiment are illustrated with like reference numerals, and the description of those elements will not be repeated. Therefore, in addition to those elements described previously, the second preferred embodiment further comprises a test question database 99 arranged to store test questions and answers together with classifications of each question stored in the database with reference to the classification index, and a test database management system 90, comprising database writing means 94 arranged to write test questions to the database 99 and read the questions therefrom, an automatic test generator 96, and an automatic pass mark generator 92. The test database management system 90 communicates with the web server 10 via a bi-directional data bus 91, and similarly the test database management system 90 communicates with the test question database 99 via a bi-directional bus 93.

The second preferred embodiment of the present invention is aimed specifically at the application of the present invention to the human resources management and recruitment field, and provides additional functionality over and above that provided by the first embodiment of the present invention in the form of the ability of job providers to set tests which must be answered by a job seeker in order to allow the job seeker to apply for the job advertised by the job provider in the form of a data object generated and stored in the database 20.

Two modes of operation are possible, a first mode wherein a test presented to a job seeker comprises questions and answers set in advance by the job provider and stored in the test question database in advance for presentation to the job seeker when the data object corresponding to the job seeker's profile matches the data object corresponding to the job to which the test relates have been found to match. In this case, should the job seeker wish to contact the job provider, the job provider may first require that the job seeker answer the test entered into the test question database in advance by the job provider before proceeding with the application process. In such a case, the test is retrieved from the test question database by the test database management system 90, and is passed to the web server 10 for the formation of web pages containing the test questions, which are then transmitted over the Internet 6 to the user 2. The tests are preferably in the form of multiple choice questions, and the user 2's answers are communicated back to the web server 10 over the Internet 6, a comparison being made at the web server 10 with the pre-stored answers and a count being kept of the number of correctly answered questions. This count is then compared with the pre-determined passmark, and if the candidate is adjudged to have passed the test then details of the job seeker are passed to the job provider.

Figure 10:
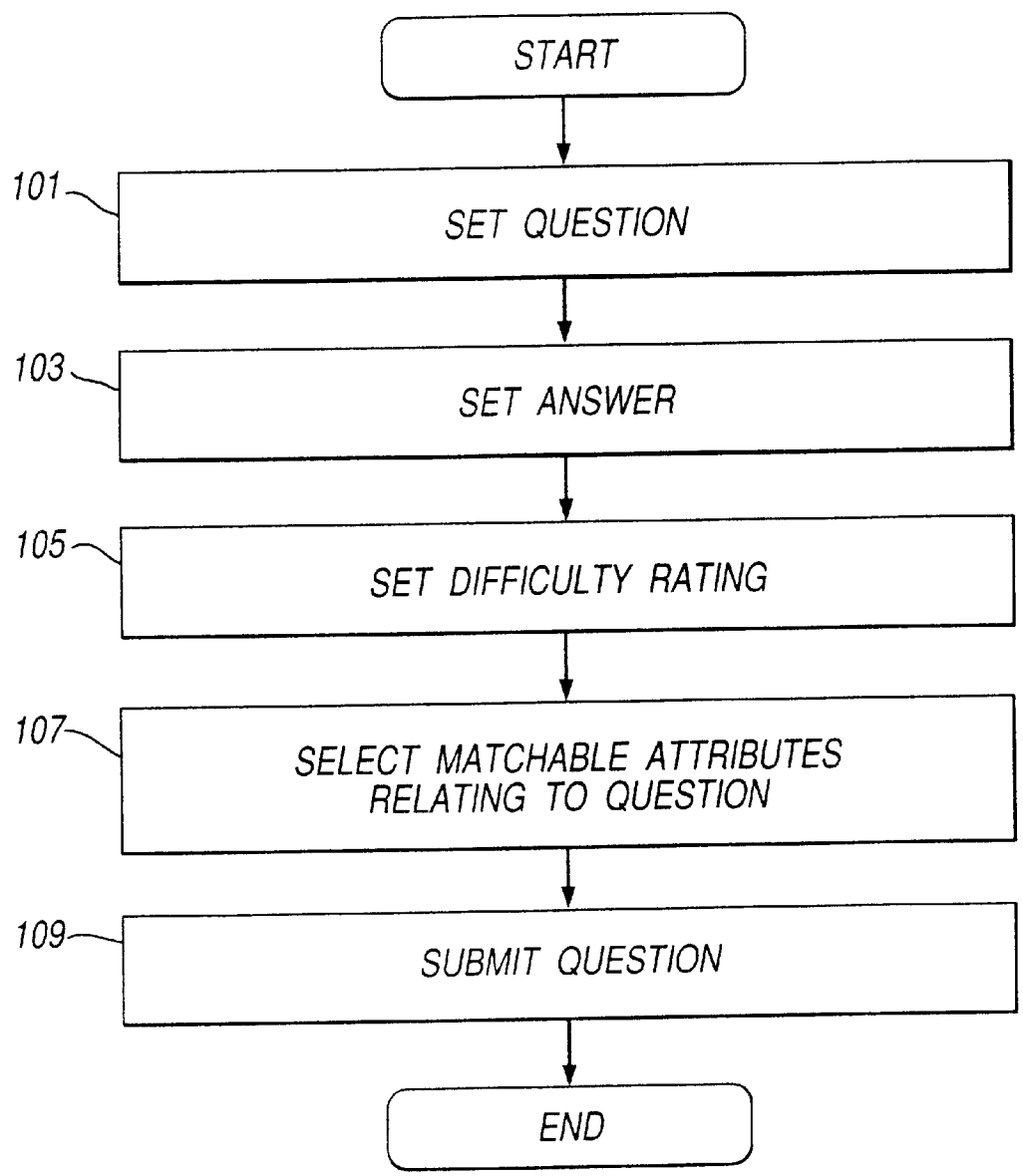
FIG. 10 is a flow diagram showing the process required for population of the test question database of the second embodiment of the present invention.

The procedure by which a job seeker may set a test is shown in FIG. 10. With reference to FIG. 10, at step 101 the job provider must first set the question by entering a question into a text box provided on a web page generated by the web server and displayed on the job provider's web browser. Next, at step 103, the job provider sets the answer again using a web page generated by the web server 10, and at step 105 sets a difficulty rating for the question. The difficulty rating is preferably one of three ratings being easy, medium and hard, and is used to assess the required pass mark for the test. In one embodiment it is possible to save the question, answer and difficulty rating set at this stage into the test question database, and this is especially preferable where a job seeker is to be asked the same questions each time in respect of the same data object relating to a particular job.

However, in a second mode of operation to be described next, it is desirable for the job provider to further access the classification index to select matchable attributes relating to the set question at step 107, and these matchable attributes are then stored in the test question database together with the question, answer and difficulty rating by submitting the question to the web server 10 whereupon it is passed by the data-bus 91 to the test database management system 90, whereupon the test question database writing means 94 writes the question together with the matchable attributes into the test question database 99. The second mode of operation is discussed further later.

Therefore, in the first mode of operation, where a job provider requires a job seeker to take a test having matched with a data object corresponding to the attributes of a particular job, the questions in the test may be fixed in advance by the job provider, together with the pass mark required to pass the test.

However, it will be apparent that the above first mode of operation has the disadvantage that it may be possible for a job seeker to fail a test, but then having seen the questions return and take the test again and pass the test. In order to prevent this, in a preferred variation of the second embodiment of the present invention, tests are automatically generated by randomly selecting questions from the test question database on the basis of the matchable attributes which were previously selected by the job provider in relation to the particular question when the question was set. The method by which tests may be automatically generated by the random selection of questions from the database will be described in relation to FIG. 11.

Figure 11:
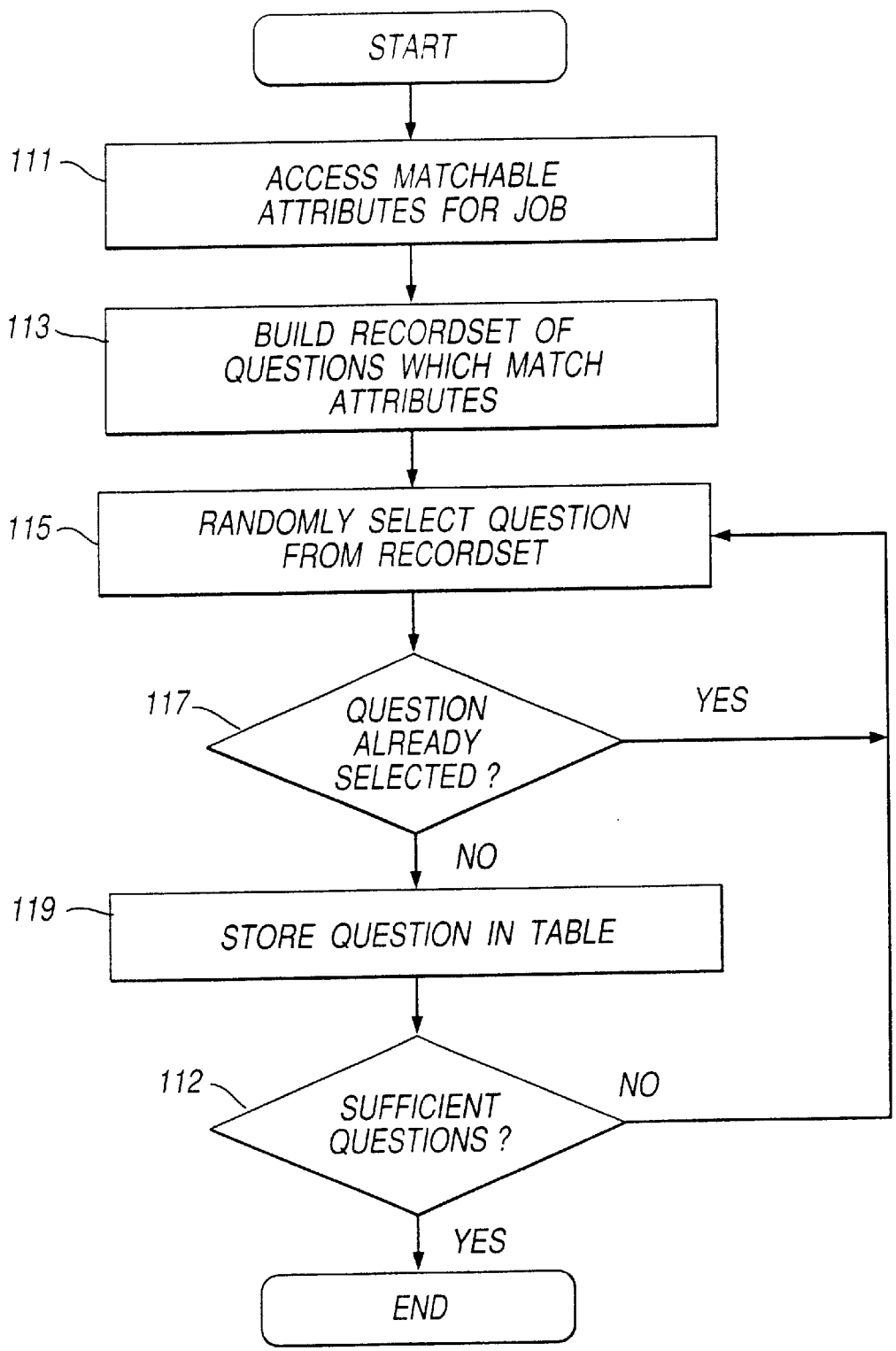
FIG. 11 is a flow diagram illustrating the steps involved in the automatic generation of tests used in the second embodiment of the present invention.

Within FIG. 11, assume that a job seeker having generated a data object corresponding to her profile and having matched the generated data object with a data object in the data object database 20 which corresponds to a matching job, now wishes to contact the job provider via the web server 10. However, prior to proceeding, if the job provider wishes job seekers who wish to apply for the job to which the data object which has been matched relates to take a test, and no set test has been specified, then a test must be dynamically generated from questions in the test question database, according to the following method.

In order to dynamically generate a test, the web server 10 controls the database management system 12 to access the data object database 20 to access the matchable attributes for the particular job from the integer arrays stored in the data object corresponding to that job. The matchable attributes from the data object are then passed from the web server to the test generation means 96 in the test database management system 90, and the test database management system 90 then accesses the test question database 99 to build a recordset of questions which match the stored attributes from the data object corresponding to the job profile, on the basis of those selected attributes of the classification index previously stored in respect of each test question entered into the test question database 99. That is, the automatic test generator 96 searches the test question database for questions which have one or more common selected attributes with the data object relating to the particular job, with respect to the common classification index. Each question found to satisfy this criteria is entered into the recordset and is allocated an index number. Alternatively, only a pointer to the question may be entered into the recordset.

Having built the recordset of questions which match the attributes at step 113, at step 115 a random number generator is initiated to generate a random number to randomly select a question from the built recordset on the basis of the question index number. The index number of the randomly selected question is then compared to the index numbers of questions already selected, and if not already selected, the question is stored in a question table 119. If the index number of the question of the recordset has already been selected and is already stored in the question table, the process flow returns to step 115 and another question is randomly selected from the recordset.

An evaluation is performed at step 112 to determine if there are sufficient questions in the question table, and if it is determined that there are more questions required then the process loops back to step 115 for random selection of another question from the recordset. Once it is determined that sufficient questions have been stored in the question table, the automatic test generation process ends and the table of questions are passed to the web server 10 over the bus 91 to be communicated to the user in the form of web pages over the Internet.

In addition to dynamically generating tests by selecting questions randomly from the test question database on the basis of selecting those questions which have matching classification index attributes, it is also required that the pass mark for the test be automatically generated, and this is achieved as follows.

The question table containing the questions in the test is accessed, and the difficulty ratings set for each question assessed. As mentioned previously, in the preferred embodiment the difficulty rating may take one of three values, being "easy", "medium", and "hard". As an example, in order to calculate the pass mark for a test, each question of a particular difficulty rating is scored on a different number of points than questions of a different difficulty rating, ie "easy" questions may score 1 point, "medium" questions may score 1½ points, and "hard" questions may score 2 points. In order to calculate the pass mark, then, a total score value is obtained by summing the points awarded for each question for every question selected to be in the test, and this is multiplied by the desired pass percentage for the test to give the pass mark, ie:

$$\text{pass mark} = \text{total score} \times \text{desired pass percentage}$$

The user may set the desired pass percentage in advance. As will be apparent, using such a system to calculate the test pass mark, it will be possible for a job seeker to pass the test by answering half as many questions of the "hard" difficulty rating correctly than questions of the "easy" difficulty rating, with variations in between.

The dynamic generation of tests in the manner described above allows for a different test to be presented to a job seeker every time a job seeker attempts to match with a particular job. This overcomes the problem of a job seeker being presented with a test comprising fixed questions that may then be viewed, and then returning to re-sit the test having found out the answers.

It will be understood from the above description of the dynamic test generation method that many variations are available, such as for example, only selecting questions for the recordset from questions which are randomly selected or which have a particular difficulty rating, or relate to a particular subject. In this way, as well as testing job seekers, the automatic test generation method used in the present invention may also be used to generate tests which can be given to present employees or individuals in order to maintain records of their skills. Furthermore, in a particularly preferred embodiment the answers given by a job seeker to a particular test are preferably stored and a record of whether a test has been passed or failed by a particular user may also be kept on the users account on the web server 10.

According to the second embodiment of the present invention, therefore, there is provided a test generation method and apparatus which allows for automatic selection of questions from a database to build tests relevant to a particular activity as classified by a data object of a first type storing selected attributes from a classification index, the selection being on the basis of pre-storing those selected attributes from the classification index relevant to a particular question, and selecting those questions from the database which have at least one common stored selected attribute with the stored selected attributes of the data object. Use of the same classification index to classify the questions stored in the test question database 99 and the data objects stored in the database 20 therefore provides for automatic and dynamic test generation on demand.

Having described the method and apparatus of the present invention, a novel business method which employs the method and apparatus of the present invention will now be discussed with reference to FIG. 12. As with the previously described embodiments, the business method to be described relates to the field of human resource management and recruitment, and will be described in relation to those actions required by job providers and job seekers when using the method and apparatus of the present invention.

Figure 12A:
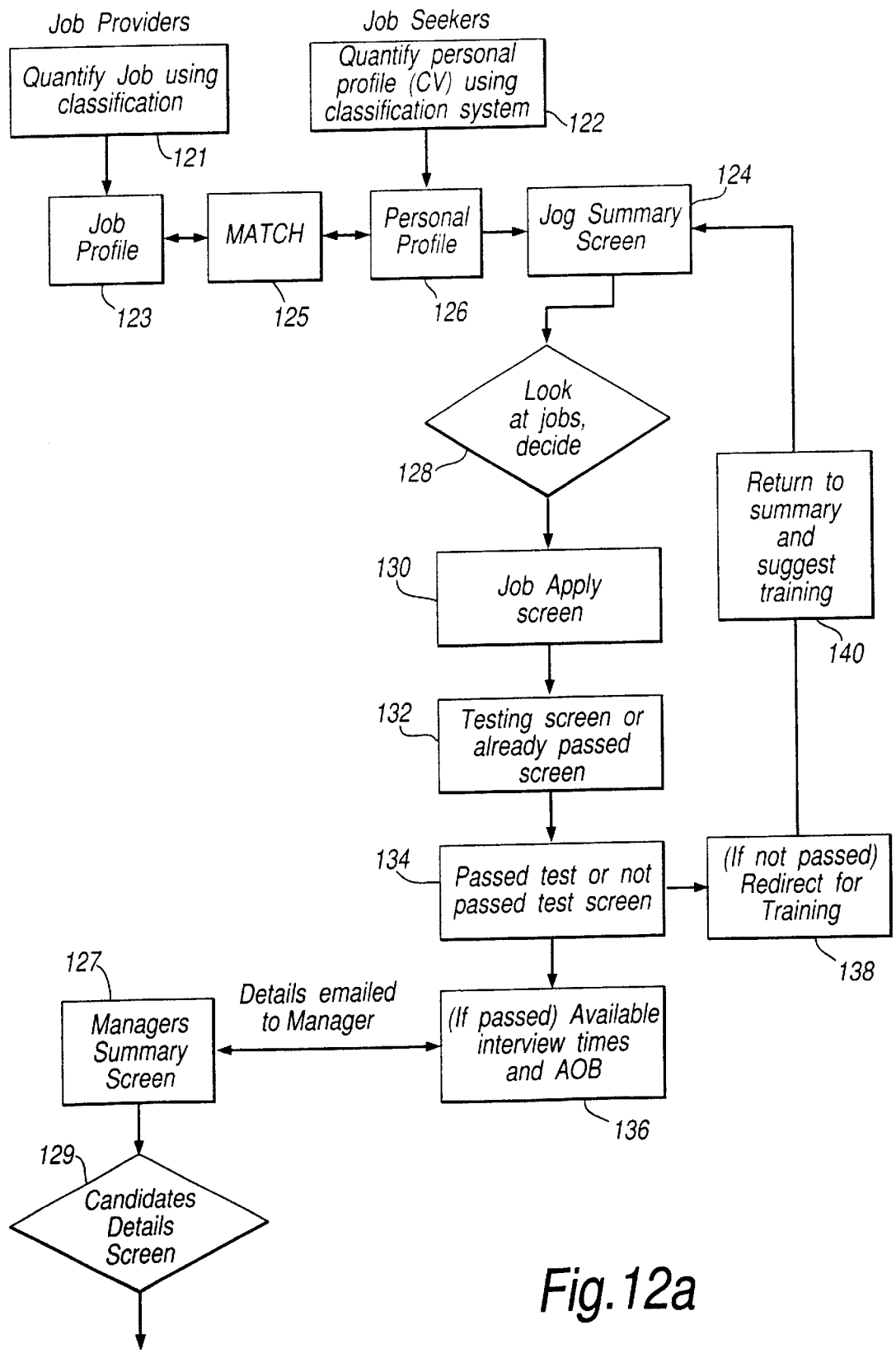
FIG. 12a and 12b are a flow diagram illustrating the application of the method and apparatus of the present invention to a novel business method used in the field of human resource management.
Figure 12B:
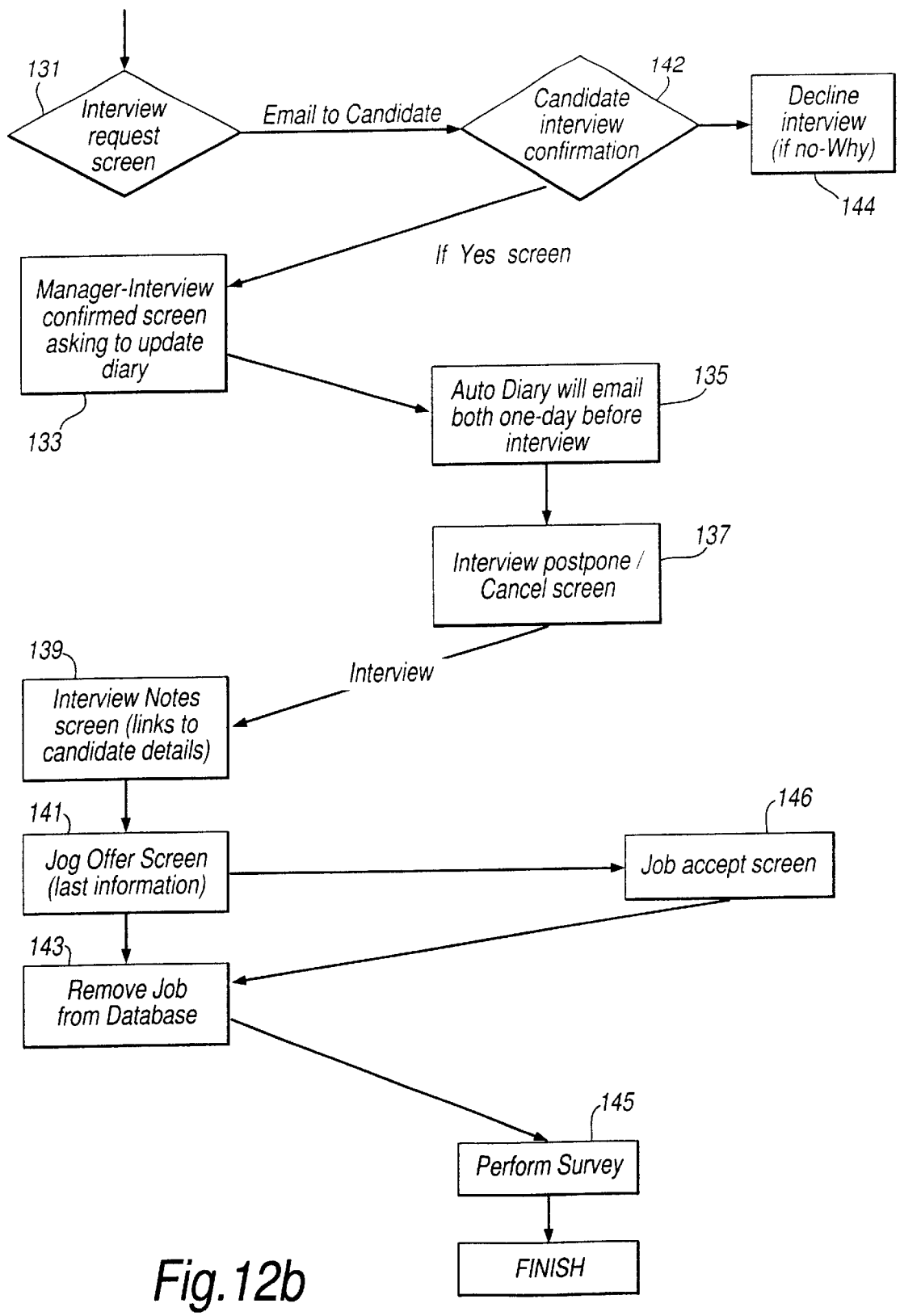

FIG. 12 shows the actions which must be undertaken by both job providers and job seekers, those actions undertaken by job providers being shown on the left and those by job seekers on the right.

The first steps which must be undertaken by the job provider are to populate the database by generating a job profile 123 in the form of the data objects discussed previously by quantifying the job using the classification system at step 121. The quantification process has been discussed previously in relation to the present invention and is generally illustrated in FIGS. 6 and 7. Similarly, on behalf of a job seeker, the job seeker must create a personal profile 126 being a data object generated by quantifying the job seeker's personal profile using the classification index as discussed previously. Having created respective job profiles and personal profiles, the present invention acts to attempt to match the profiles in the manner as discussed previously, and using the matching process shown in FIG. 8. Assuming that the job profile 123 and personal profile 126 match, the next stage in the business method is to display to the job seeker a job summary screen 124 which illustrates additional information stored in the data object corresponding to the job as the type-specific fields such as the strings of free text, Boolean values, integers, pictures etc etc. As previously, this additional information stored in the data object is displayed to the job seeker in the form of web pages provided by the web server 10 over the Internet 6 and displayed using a web browser provided on the job seeker's computer 2. This information constitutes the job summary.

Having displayed the job summary information, the job seeker must browse this information at step 128 and if he decides to apply for the job clicks on a link which is communicated back to the web server 10 which then displays the job apply screen to the job seeker at step 130. The job seeker then completes the details required on the job apply screen and this information is submitted back to the web server 10 over the Internet and if required a testing screen is displayed to the job seeker in order for the job seeker to take a test. As discussed previously this test may be set in advance, or may be automatically and dynamically generated. The job seeker fills in the multiple choice answers on the test and the answers are passed back to the web server 10 for an evaluation as to whether the job seeker has passed or failed at step 134. If it is determined that the job seeker has not passed the test at step 138, the web server redisplays the job summary screen 124 and suggests that the job seeker undertakes training. If it is determined at step 134 that the job seeker has passed the test a screen is displayed to the job seeker to allow the job seeker to enter available interview times and these details are sent back to the web server 10 whence they are subsequently e-mailed to the job provider at step 127. Having received the e-mail, the job provider 127 then accesses the web server 10 and having completed the registration procedures can access the job seeker's details as a web page at step 129 and if these details are acceptable progresses to the interview request screen at step 131. The job provider fills in the details required on the interview request screen and these are transmitted back to the web server 10 over the Internet 6 and an e-mail is generated by the web server 10 to the job seeker at step 142 who then indicates her acceptance or declination of the interview. If the job seeker indicates acceptance of the interview, this confirmation is communicated to the job provider at step 133, and the web server 10 makes an entry in a diary system to e-mail both the job provider and the job seeker one date before the interview at step 135. When the web server 10 automatically e-mails the job provider and job seeker, upon subsequent log on and registration procedures of the job provider and job seeker to the web site an interview postpone or cancel screen is displayed at step 137.

Provided that the interview is not postponed and the interview goes ahead, during the interview an interview notes screen is displayed to the job provider at step 139 upon which notes can be made and links are provided to the job seeker's personal details saved as the relevant data object in the database. Providing that the job seeker is suitable for the job, a job offer screen is then displayed to the job provider for the job provider to fill the appropriate details in, which are then transmitted back to the web server 10 over the Internet 6, the web server 10 then generating an acceptance screen as step 146 to be displayed to the job seeker for the job seeker to indicate acceptance of the job. If the job seeker indicates acceptance of the job and transmits this over the Internet back to the web server 10, the data object corresponding to the job is removed from the database at step 143, and web pages constituting a survey are transmitted to the job provider and job seeker at 145. This concludes the steps of the preferred embodiment of the business method of the present invention.

It will be understood that the above described business method may be varied in several ways. For example, while the above has been presented with the job provider first populating the database and an individual job seeker then searching the database for matching jobs, it may also be possible for reverse operation in the form of a job provider searching the database in order to match pre-stored data objects previously stored by one or more job seekers with a newly created data object corresponding to a job profile.

Furthermore, the present invention may also allow users of either type to search through data objects of the same type if required. In such an operation, however, it is envisaged that those data object type-specific data fields in the data object which may contain confidential information such as personal details, salary details, etc. will be restricted access to users of the same type.

What is claimed:

1. A method of matching data objects using a classification index comprising a plurality of predefined classification categories, each of said categories containing one or more predefined user-selectable attributes, said method comprising the step of:
    a) pre-storing one or more data objects of a first type in a database, each of said data objects storing one or more attributes of one or more of said plurality of classification categories;
    b) displaying said plurality of classification categories to a user for selection of one or more attributes from at least one of said classification categories;
    c) storing the selected attributes in the database in the form of a data object of a second type;
    d) comparing the stored attributes of the data object of the second type with the stored attributes of the data objects of the first type; and
    e) matching said data objects of the respective types which have at least a predetermined threshold number of common stored attributes.

2. A method according to claim 1 wherein said prestoring step comprises the steps of:
    a) displaying said plurality of classification categories to at least one user of a first type for selection of one or more attributes from at least one of said classification categories; and
    b) storing the selected attributes in the database in the form of a data object of the first type.

3. A method according to claim 2, wherein said displaying step (a) further comprises the steps of:
    a) transmitting said plurality of classification categories to the user of the first type in the form of web pages over the Internet; and
    b) receiving data over the Internet from the user of a first type corresponding to the user's attribute selections.

4. A method according to claim 1, wherein said displaying step (b) further comprises the steps of:
    a) transmitting said plurality of classification categories to the user in the form of web pages over the Internet; and
    b) receiving data over the Internet from the user corresponding to the user's attribute selections.

5. A method according to claim 1, further comprising the step of displaying those matching data objects of the first type found to match at the matching step of the user.

6. A method according to claim 5, wherein said displaying step comprises transmitting said matching data objects of the first type to the user in the form of web pages over the Internet.

7. A method according to claim 1, wherein said plurality of classification categories are grouped into two or more classes, each class having a different predetermined threshold number, and wherein said matching step (e) further comprises matching data objects of the respective types which have a number of common stored attributes in each class of classification categories greater than or equal to the respective predetermined threshold number for the respective class.

8. A method according to claim 1, wherein the data objects of the first or second types each comprise one or more pointer values into a look-up table, each user-selectable attribute in each classification category having an entry in the look-up table.

9. A method according to claim 8, wherein said comparison step further compares the stored pointer values of the respective data types.

10. A method according to claim 8, wherein said data objects of the first or second type each further comprise type-specific data variables.

11. A method according to claim 1, further comprising the steps of:
    a) pre-storing a plurality of questions and associated answers in a test-question database;
    b) displaying a sub-set of the plurality of questions to the user, the sub-set of questions being associated with a matching data object of the first type found to match the data object of the second type generated by the user;
    c) receiving the user's answers to the displayed questions; and
    d) evaluating the received answers with the pre-stored answers to determine a test mark.

12. A method according to claim 11, wherein said pre-storing step (a) further comprises the step of:
    categorizing each of said plurality of questions in accordance with the plurality of classification categories.

13. A method according to claim 12, wherein said displaying a sub-set of the plurality of questions further comprises the steps of:
    a) dynamically generating the sub-set of questions in accordance with the classification categories assigned to each question and the user-selectable attributes stored in the matching data object of the first type; and
    b) displaying the sub-set of questions to the user of the second type;
    wherein a particular question is added to the sub-set if at least one of the classification categories assigned to the particular question corresponds to at least one of the classification categories corresponding to the user-selectable attributes stored in the matching data object of the first type.

14. A method according to claim 13, wherein said generating step (a) further comprises the step of:
    creating a recordset of questions with at least one corresponding classification category to the stored attributes of the matching data object;
    randomly selecting a question from the recordset;
    checking the sub-set of questions to determine if the question has already been selected; and
    adding the question to the sub-set of questions if it is determined that the question has not already been selected.

15. A method according to claim 11, wherein the sub-set of questions is determined in advance for a particular data object of the first type.

16. A method according to claim 11, further comprising the step of storing the user's answers and test mark.

17. An apparatus for matching data objects comprising:
database means for storing a database using a classification index comprising a plurality of predefined classification categories, each of said predefined classification categories containing one or more pre-defined user-selectable attributes arranged to pre-store one or more data objects of a first type, each of said data objects storing one or more of said pre-selected attributes of one or more of said plurality of classification categories;
displaying means for displaying said plurality of classification categories to a user for selection of one or more attributes from at least one of said classification categories; and
database management means, said database management means further comprising:
database writing means for writing the user-selected attributes in the database in the form of a data object of a second type;
attribute comparison means for comparing the stored attributes of the data object of the second type with the stored pre-selected attributes of the data objects of the first type; and
data object matching means for matching data objects of respective types which have at least a predetermined threshold number of common stored attributes.

18. An apparatus according to claim 17, wherein said displaying means further comprises:
web-page generation means for generating web-pages;
transmission means for transmitting generated web-pages over the Internet; and
receiving means for receiving data over the Internet from the user.

19. An apparatus according to claim 18, wherein said web-page generation means generates web-pages displaying the plurality of classification categories; said transmission means transmits the generated web-pages over the Internet to at least one user of a first type for selection of one or more attributes from at least one of said classification categories; and said receiving means receives data over the Internet from the user of the first type corresponding to the user's attribute selection; wherein the database writing means is further arranged to write the received data into the database in the form of one or more data objects of the first type.

20. An apparatus according to claim 18, wherein said web-page generation means generates web-pages displaying the plurality of classification categories; said transmission means transmits the generated web-pages over the Internet to the user for selection of one or more attributes from at least one of said classification categories; and said receiving means receives data over the Internet corresponding to the user's attribute selections; wherein the database writing means is further arranged to write the received data into the database in the form of a data object of the second type.

21. An apparatus according to claim 18, wherein said web-page generation means generates web-pages displaying those matching data objects of the first type found to match by the data object matching means; and said transmission means transmits the generated web-pages to the user.

22. An apparatus according to claim 17, wherein said plurality of classification categories are grouped into two or more classes, each class having a different predetermined threshold number; and said data object matching means is further arranged to match data objects of the respective types which have a number of common stored attributes in each class of classification categories greater than or equal to the respective predetermined threshold number for the respective class.

23. An apparatus according to claim 17, and further comprising means for storing a look-up table of pointer values corresponding to the user-selectable attributes; wherein the data objects of the first or second types each comprise one or more of said pointer values, each user-selectable attribute in each classification category having a entry in the look-up table.

24. An apparatus according to claim 23, wherein said attribute comparison means is further arranged to compare the stored pointer values of the respective data types.

25. An apparatus according to claim 23, wherein said data objects of the first or second type each further comprise type-specific data variables.

26. An apparatus according to claim 17, and further comprising:
a test-question database arranged to store a plurality of questions and associated answers; and
test generation means arranged to generate a test comprising a sub-set of the plurality of questions, the sub-set of questions being associated with a matching data object of the first type found to match the data object of the second type generated by the user.

27. An apparatus according to claim 26, wherein each of said plurality of questions is categorized in accordance with the plurality of classification categories.

28. An apparatus according to claim 27, wherein the test-generation means is further arranged to dynamically generate the sub-set of questions in accordance with the classification categories assigned to each question and the user-selectable attributes stored in the matching data object of the first type; wherein a particular question is added to the sub-set if at least one of the classification categories corresponding to the user-selectable attributes stored in the matching data object of the first type.

29. An apparatus according to claim 28, wherein the test-generation means further comprises:
recordset creation means arranged to create a recordset of questions with at least one corresponding classification category to the stored attributes of the matching data object;
question selection means arranged to randomly select a question from the recordset; and
test-checking means arranged to check the sub-set of questions to determine if the selected question has already been selected;
wherein the selected question is added to the sub-set of questions if the test-checking means determines that the question has not already been selected.

30. An apparatus according to claim 26, wherein the sub-set of questions is determined in advance for a particular data object of the first type.

31. An apparatus according to claim 26, and further comprising storage means for storing the user's answers to the sub-set of questions and associated test mark.

32. A computer readable storage medium for storing data objects and matching the data objects using a classification index comprising a plurality of classification categories, each of said categories containing one or more user-selectable attributes the program being arranged to control the steps of:

a) pre-storing one or more data objects of a first type in a database, each of said data objects storing one or more of said attributes of one or more of said plurality of classification categories;

b) displaying said plurality of classification categories to a user for selection of one more more attributes from at least one of said classification categories;

c) storing the selected attributes in the database in the form of a data object of a second type;

d) comparing the stored attributes of the data object of the second type with the stored pre-selected attributes of the data objects of the first type; and e) matching said data objects of the respective types which have at least a predetermined threshold number of common stored attributes.

33. A computer-readable storage medium according to claim 32 wherein said pre-storing step comprises the steps of:

a) displaying said plurality of classification categories to at least one user of a first type for selection of one or more attributes from at least one of said classification categories; and b) storing the selected attributes in the database in the form of a data object of the first type.

34. A computer-readable storage medium according to claim 33, wherein said displaying step (a) further comprises the steps of:

a) transmitting said plurality of classification categories to the user of the first type in the form of web pages over the Internet; and b) receiving data over the Internet from the user of a first type corresponding to the user's attribute selections.

35. A computer-readable storage medium according to claim 32, wherein said displaying step (b) further comprises the steps of:

a) transmitting said plurality of classification categories to the user in the form of web pages over the Internet; and b) receiving data over the Internet from the user corresponding to the user's attribute selections.

36. A computer-readable storage medium according to claim 32, wherein said program is further arranged to control the step of displaying those matching data objects of the first type found to match at the matching step to the user.

37. A computer-readable storage medium according to claim 36, wherein said displaying step comprises transmitting said matching data objects of the first type to the user in the form of web pages over the Internet.

38. A computer-readable storage medium according to claim 32, wherein said plurality of classification categories are grouped into two or more classes, each class having a different predetermined threshold number; and wherein said matching step (e) further comprises matching data objects of the respective types which have a number of common stored attributes in each class of classification categories greater than or equal to the respective predetermined threshold number for the respective class.

39. A computer-readable storage medium according to claim 32, wherein the data objects of the first or second types each comprise one or more pointer values into a look-up table, each user-selectable attribute in each classification category having an entry in the look-up table.

40. A computer-readable storage medium according to claim 39, wherein said comparison step further compares the stored pointer values of the respective data types.

41. A computer-readable storage medium according to claim 39, wherein said data objects of the first or second type each further comprise type-specific data variables.

42. A computer-readable storage medium according to claim 32 wherein the program is further arranged to control the steps of:

a) pre-storing a plurality of questions and associated answers in a test-question database;

b) displaying a sub-set of the plurality of questions to the user, the sub-set of questions being associated with a matching data object of the first type found to match the data object of the second type generated by the user;

c) receiving the user's answers to the displayed questions; and d) evaluating the received answers with the pre-stored answers to determine a test mark.

43. A computer-readable storage medium according to claim 42, wherein said pre-storing step (a) further comprises the step of:

categorizing each of said plurality of questions in acceptance with the plurality of classification categories.

44. A computer readable storage medium according to claim 43, wherein displaying a subset of the plurality of question further comprises the steps of:

a) dynamically generating the sub-set of questions in accordance with the classification categories assigned to each question and the user-selectable attributes stored in the matching data object of the first type; and b) displaying the sub-set of questions to the user of the second type; wherein a particular question is added to the sub-set if at least one of the classification categories assigned to the particular question corresponds to at least one of the classification categories corresponding to the usr-selectable attributes stored in the matching data object of the first type.

45. A computer-readable storage medium according to claim 42, wherein said generating step (a) further comprises the step of:

creating a recordset of questions with at least one corresponding classification category to the stored attributes of the matching data object;

selecting at random a question from the recordset;

checking on the sub-set of questions to determine if the question has already been selected; and adding the question to the sub-set of question if it is determined that the question has not already been selected.

46. A computer-readable storage medium according to claim 43, wherein the sub-set of questions is determined in advance for a particular data object of the first type.

47. A computer-readable storage medium according to claim 42, wherein the program is further arranged to control the step of storing the user's answers and test mark.

\* \* \* \* \*